UNITED STATES PATENT OFFICE.

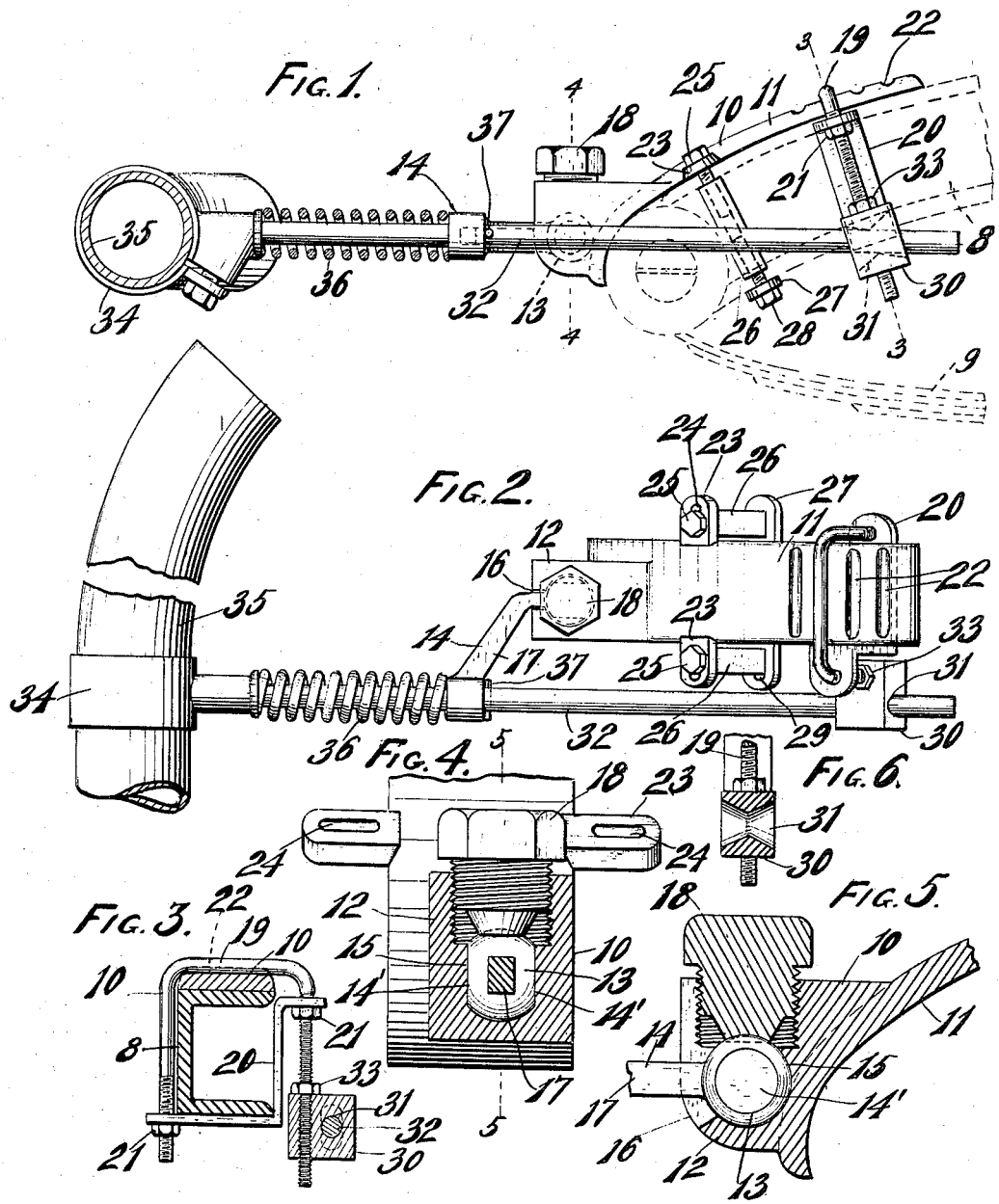

JAYSON K. BOND, OF MILWAUKEE, WISCONSIN, ASSIGNOR OF ONE-HALF TO KENNETH W. JACOBS, OF MILWAUKEE, WISCONSIN.

AUTOMOBILE-FENDER.

1,027,808.   Specification of Letters Patent.   Patented May 28, 1912.

Application filed March 2, 1911. Serial No. 611,763.

*To all whom it may concern:*

Be it known that I, JAYSON K. BOND, a citizen of the United States, residing in Milwaukee, in the county of Milwaukee and State of Wisconsin, have invented new and useful Improvements in Automobile-Fenders, of which the following is a description, reference being had to the accompanying drawings, which are a part of this specification.

This invention relates to improvements in fenders especially adapted for automobiles.

It is one of the objects of this invention to provide a fender which may be quickly and easily attached to the front portion of an automobile of any standard make now on the market without the necessity of drilling any holes or cutting any portion of the automobile frame or body.

A further object of the invention is to provide a fender with means whereby it may be adjusted to maintain its plunger rods in a horizontal position with relation to the automobile.

A further object of the invention is to provide a fender with means whereby it may be connected to the frame of an automobile which may be provided with either full or half elliptical springs.

A further object of the invention is to provide a fender which is strong and durable and is simple in construction and operation and is inexpensive to manufacture.

With the above, and other objects in view, the invention consists of the automobile fender and its parts and combinations as set forth in the claims, and all equivalents thereof.

In the accompanying drawing in which the same reference characters indicate the same parts in all of the views: Figure 1 is a vertical sectional view of one portion of the improved automobile fender shown connected to an automobile frame, said frame being shown by dotted lines; Fig. 2 is a plan view of one of the side attaching members of the fender and a portion of the buffer bar; Fig. 3 is a transverse sectional view of a portion of an automobile frame and the fender connected thereto taken on line 3—3 of Fig. 1; Fig. 4 is a vertical sectional detail view taken on line 4—4 of Fig. 1; Fig. 5 is a vertical sectional detail view taken on line 5—5 of Fig. 4; and Fig. 6 is a vertical sectional detail view of the plunger rod block.

While the drawing shows only one half of the fender for convenience of illustration, it is to be understood that the specification and the claims are intended to and do describe and claim the complete structure which consists of two attaching members, operatively connected together by means of a buffer bar.

Referring to the drawing the numeral 8 indicates a portion of the frame and 9 a portion of the half elliptical spring of an automobile which is provided with the improved fender. The fender is designed to be connected to the front portions of the frame on each side of the automobile and is provided with attaching means 10 (only one being shown) for that purpose. Each attaching means is formed of an upper curved connecting member 11 shaped to conform to the upper front end of an automobile frame and is provided with a recessed enlargement 12 on its forward end to accommodate the ball end 13 of an eyed bracket 14. The ball end 13 of the bracket is slabbed or provided with flattened sides 14' and the recess 15 of the enlargement is similarly formed to provide a pivotal connection between the two parts which will permit the bracket to be swung vertically. The enlargement is provided with a vertical slot 16 through which the arm 17 of the bracket extends, and a bolt 18 threaded into the enlargement and having a cupped end bearing against the ball end of the bracket serves to securely lock the bracket in an adjusted position. A clip bolt 19 looped over the connecting member and the frame member has its ends extending through openings of the angular clip strap 20, and nuts 21 threaded on the bolt serve to clamp the two members together. The angularity of the clip strap provides for the close engagement of the strap with the lower and the side portions of the frame member. The upper portion of the connecting member is provided with a number of transverse grooves, one of which is engaged by the clip bolt to securely hold the parts in their adjusted position. The forward portion of the connecting member has lateral lugs 23 projecting therefrom having elongated slots 24 formed therein to accommodate bolts 25 which extend therethrough and are threaded into the upper ends of threaded sleeves 26, one of which is positioned on each side of the frame member 8. A clip 27 extending transversely beneath the frame 8 is provided with openings through which bolts 28 pass and are threaded into the lower ends of the threaded sleeves 26. One of the openings of the clip is in the form of a slot 29 to provide for adjusting the connecting member to frames of varying thicknesses. An adjustable guide block 30, threaded on one end of the clip bolt 19, is provided with an opening 31 which tapers outwardly in opposite directions and in a vertical plane from a medial point of the block 30 to accommodate a plunger rod 32. The guide block is held in adjusted position on the clip bolt by means of a lock nut 33.

Each plunger rod 32 extends loosely through its guide block and the eye of the bracket 14 and its front end carries a clamp collar 34 which surrounds a tubular buffer 35. This buffer extends transversely across the front portion of the frame and is resiliently connected to both connecting members. The ends of the guard are curved rearwardly to protect the front wheels of the automobile. A coiled spring 36 surrounding each plunger rod and interposed between the clamping collar and the eyed bracket serves to yieldingly hold the plunger rod in its forward position. A pin 37 extending transversely through the plunger rod in the rear of the eyed bracket limits the forward movement of said rod.

From the foregoing description it will be seen that the fender may be easily connected to any standard frame and adjusted to a horizontal position with relation thereto so that the plunger rods will yield in a horizontal line and cushion any blows received.

What I claim as my invention is:

1. An automobile fender, comprising connecting members provided with recessed forward enlargements, eyed brackets positioned therein and extending therefrom, guide blocks carried by the rearward portions of the connecting members and provided with openings, a buffer carried by plunger rods which extend through the eyes of the eyed brackets and through the openings of the guide blocks, and springs interposed between the buffer and the eyed brackets.

2. An automobile fender, comprising connecting members provided with recessed forward enlargements, eyed brackets positioned therein and extending therefrom, guide blocks carried by the rearward portions of the connecting members and provided with openings, a buffer carried by plunger rods which extend through the eyes of the eyed brackets and through the openings of the guide blocks, and coiled springs surrounding the plunger rods and interposed between the buffer and the eyed brackets.

3. An automobile fender, comprising connecting members, eyed brackets adjustably connected thereto, guide blocks adjustably connected to the rearward portions of the connecting members, a buffer carried by a pair of plunger rods which extend loosely through the eyed brackets and through the openings of the guide blocks, coiled springs surrounding the plunger rods and interposed between the buffer and the eyed brackets, and stops for limiting the forward movement of the plunger rods.

4. An automobile fender, comprising connecting members provided with recessed forward enlargements, clip bolts looped over the connecting members, guide blocks adjustably connected to the clip bolts and provided with openings, eyed brackets adjustably positioned within the recesses of the enlargements and extending therefrom, a buffer carried by a pair of plunger rods which extend through the eyes of the eyed brackets and through the openings of the guide blocks, coiled springs surrounding the plunger rods and interposed between the buffer and the eyed brackets, and stops for limiting the forward movement of the plunger rods.

5. An automobile fender, comprising connecting members provided with recessed forward enlargements, said members being provided with laterally projecting eyed ears through which bolts extend, sleeves threaded on said bolts, clips extending transversely across and beneath the connecting members and provided with bolts which are also threaded into the sleeves, clip bolts looped over the connecting members, guide blocks adjustably connected to the clip bolts and provided with openings, eyed brackets adjustably positioned within the recesses of the enlargements and extending therefrom, a buffer carried by a pair of plunger rods which extend through the eyes of the eyed brackets and through the openings of the guide blocks, coiled springs surrounding the plunger rods and interposed between the buffer and the eyed brackets, and stops for limiting the forward movement of the plunger rods.

6. An automobile fender, comprising connecting members provided with forward enlargements having rounded recesses formed therein, eyed brackets having ball shaped ends which are positioned within said recesses to permit a vertical swing of said brackets, screws threaded into the connecting members and bearing against the ball shaped ends to lock them in adjusted position, said connecting members having laterally projecting eyed ears through which bolts extend, sleeves threaded on said bolts, clips extending transversely across and beneath the connecting members and provided with bolts which are also threaded into the sleeves, clip bolts looped over the connecting members, angular clip plates extending transversely across and beneath the connecting members and through which the clip bolts extend, guide blocks threaded on the clip bolts and provided with plunger rod openings, a buffer carried by a pair of plunger-rods which extend through the eyes of the eyed brackets and through the openings of the guide blocks, coiled springs surrounding the plunger rods and interposed between the buffer and the eyed brackets, and stops for limiting the forward movement of the plunger rods.

In testimony whereof, I affix my signature, in presence of two witnesses.

JAYSON K. BOND.

Witnesses:
C. H. KEENEY,
LAURA A. KELLEY.